(12) United States Patent
Jennings

(10) Patent No.: US 8,788,451 B2
(45) Date of Patent: Jul. 22, 2014

(54) CENTRAL REPOSITORY FOR SEARCHES

(75) Inventor: Terry Don Jennings, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 78 days.

(21) Appl. No.: 13/031,020

(22) Filed: Feb. 18, 2011

(65) Prior Publication Data
US 2012/0215737 A1  Aug. 23, 2012

(51) Int. Cl.
*G06F 17/30* (2006.01)

(52) U.S. Cl.
USPC ............................................. 707/602

(58) Field of Classification Search
USPC ............................................. 707/602
See application file for complete search history.

(56) References Cited

U.S. PATENT DOCUMENTS

| | | | |
|---|---|---|---|
| 6,907,423 B2 | 6/2005 | Weil et al. | |
| 7,779,042 B1 | 8/2010 | Bland et al. | |
| 8,060,463 B1 * | 11/2011 | Spiegel | 707/609 |
| 2003/0046281 A1 * | 3/2003 | Son | 707/6 |
| 2007/0156843 A1 | 7/2007 | Sagen et al. | |
| 2008/0005072 A1 | 1/2008 | Meek et al. | |
| 2009/0094330 A1 * | 4/2009 | McQuaide et al. | 709/205 |
| 2009/0119256 A1 * | 5/2009 | Waters et al. | 707/3 |
| 2009/0265342 A1 * | 10/2009 | Shuster | 707/5 |
| 2009/0287683 A1 | 11/2009 | Bennett | |
| 2011/0184936 A1 * | 7/2011 | Lymberopoulos et al. | 707/721 |

OTHER PUBLICATIONS

Henry, Rebecca, "Invention Machine Announces Availability of Goldfire Innovator 4.0", Apr. 24, 2007, Invention Machine Corporation, Boston, MA, 3 pages.

* cited by examiner

*Primary Examiner* — Rehana Perveen
*Assistant Examiner* — Alexander Khong
(74) *Attorney, Agent, or Firm* — Sheridan Ross P.C.

(57) ABSTRACT

Search systems and methods are disclosed. Content and data in support of search results are stored in a central repository. Moreover, the centrally stored content and data can be made available to one or more authorized devices. Searches can be conducted across a single device, or a community of devices. The community of devices over which a search is performed can include devices that are not publicly accessible, and that require the provision of authentication information. The community of devices over which a search is performed, and the set of authorized devices, can be determined based on various factors.

17 Claims, 3 Drawing Sheets

CENTRAL REPOSITORY FOR SEARCHES

FIELD

The present invention relates to computerized searches and search results data. More particularly, data to support searches are stored in a central repository.

BACKGROUND

Computer users frequently desire to locate specific information contained in various repositories. For example, computer users often conduct searches across the Internet for information responsive to user entered queries. Similarly, searches can be conducted across company intranets or clusters. Further, searches can be conducted on information stored locally on a personal computer. Typically, users must search in these places separately.

The storage of indexed search data locally addresses concerns related to privacy and the proprietary nature of certain data. However, locally stored search data are lost if the machine used to conduct a search crashes or otherwise becomes inoperable. In addition, searches previously performed by a user on one device are not available to that user on other devices. Similarly, searches performed on one device are not available to other users, even though access to previously performed search data could be beneficial to such other users.

In addition to search engines operative to search publicly accessible data, search engines have been developed for use across proprietary databases. Search engines have also been developed for use in locating information stored on individual machines. However, the set of devices that can be searched, particularly in connection with proprietary networks and machines, has typically been static. Moreover, searching across peer user devices and/or desktops has been prohibited. Accordingly, sources of potentially relevant data have been unavailable.

SUMMARY

Embodiments of the present invention are directed to solving these and other problems and disadvantages of the prior art. In accordance with embodiments of the present invention, a system is provided in which search data are stored in a central repository. In accordance with further embodiments of the present invention, searches can be conducted across communities of users. In accordance with still other embodiments of the present invention, communities of users can be defined based on relationships between community members.

The results of searches performed across information repositories, such as the Internet, a private intranet, or an adhoc or other community of resources are, in accordance with embodiments of the present invention, stored in a central repository. Accordingly, the search data can be accessed from machines other than the machine from which the data originated. Moreover, the storage of search data in a central repository allows users within an authorized community of users to access the search data, in addition to the user who initiated the search. The information stored as part of the search can include a ranked list of hits responsive to a query, and the results can be ordered by priority, relevance, date, or other criteria. Moreover, the search data can indicate whether the user has followed links included in the results. The central repository in which the search data are stored can comprise a storage node established on the Internet or in the cloud, an intranet, or other location external to the user's device.

In accordance with still other embodiments of the present invention, searches can be performed across a community of devices. The community of devices can be defined by various criteria, such as the company, department, or group to which the user conducting the search belongs. Moreover, the organizational relationship or position of a user with respect to other users can determine whether access to other user machines within the group is authorized. Accordingly, searches of other user desktop devices, or other nodes within a grouping, can be conducted. The establishment of groupings and search authorization can be performed through the application of rules engines. Moreover, the results of such searching can be stored in a central repository, and can be accessed by other users within the grouping from which the search results were obtained.

In accordance with still other embodiments of the present invention, groupings of user devices or other nodes can be defined on an adhoc or other basis. For example, in addition to establishing groupings based on organizational structure or relationship, groupings can be based on subject matter or events in common. For example, searching can be enabled across devices associated with users participating in a conference call or meeting, or other groupings that are identifiable, but that are not necessarily static. Access to search result data generated in response to a query conducted across an adhoc community can be limited to members of the community. Moreover, access to search result data can be limited to data that is determined to be relevant to the activity or other association that resulted in creation of the community. In addition, information relevant to an adhoc community may be automatically and specially designated.

Additional features and advantages of embodiments of the present invention will become more readily apparent from the following description, particularly when taken together with the accompanying drawings.

DETAILED DESCRIPTION

Figure 1:
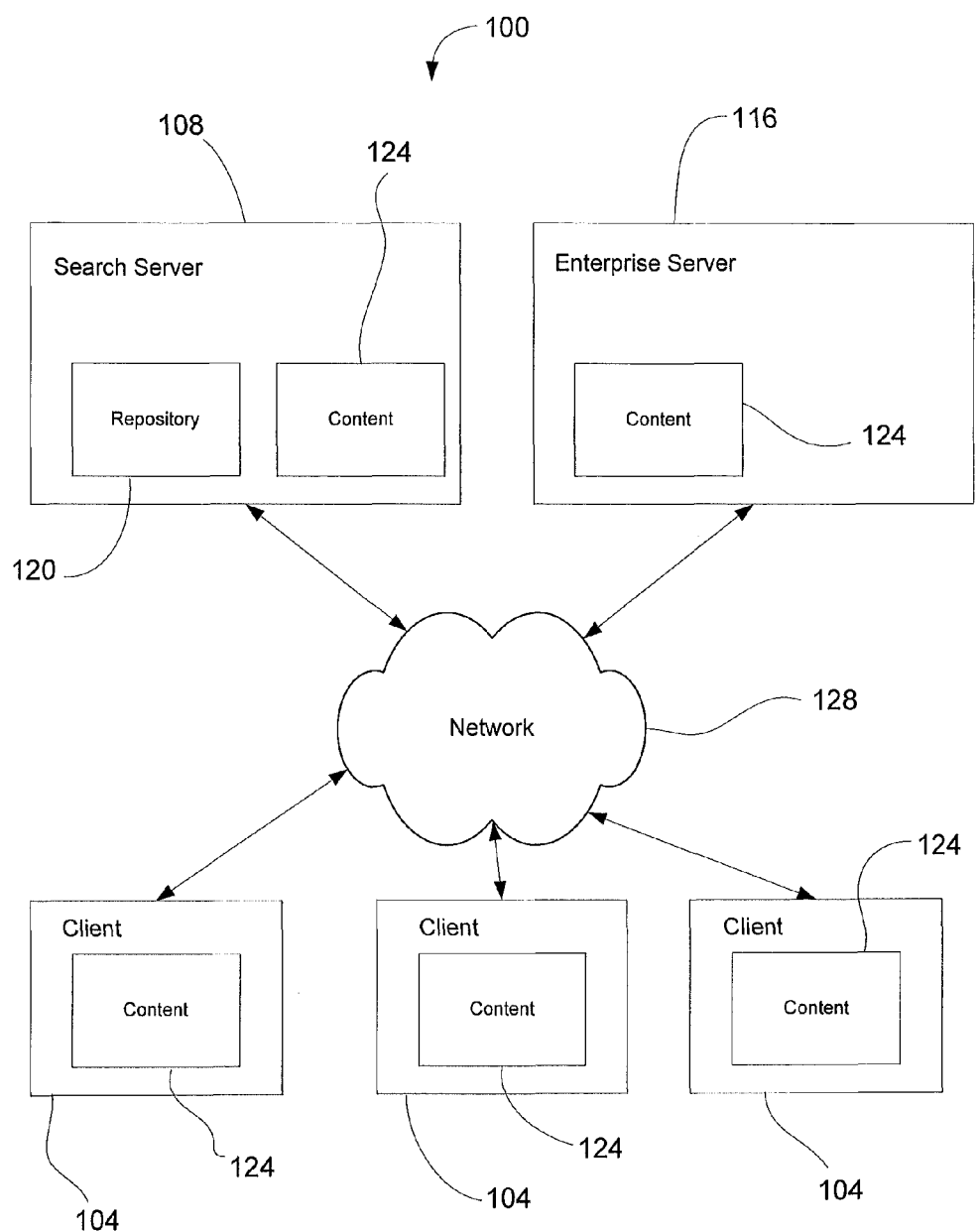
FIG. 1 depicts components of a system in accordance with embodiments of the present invention.

A system 100 comprising a central repository for search result data in accordance with embodiments of the present invention is depicted in FIG. 1. The system 100 generally includes one or more user or client devices 104. In addition, the system 100 includes a search server 108. The search server 108 can include a central repository 120 of search data and/or search engine components. The system 100 can also include additional nodes, such as one or more enterprise servers 116. In addition, in accordance with embodiments of the present invention, some or all of the nodes 104, 108 and/or 116 can include content 124. One or more networks 128 generally interconnects the various nodes 104, 108 and 116 of the system 100. The network 128 can comprise the Internet, a private intranet, the local area network, a direct connection between devices, a bus, or other wired or wireless connection.

Figure 2:
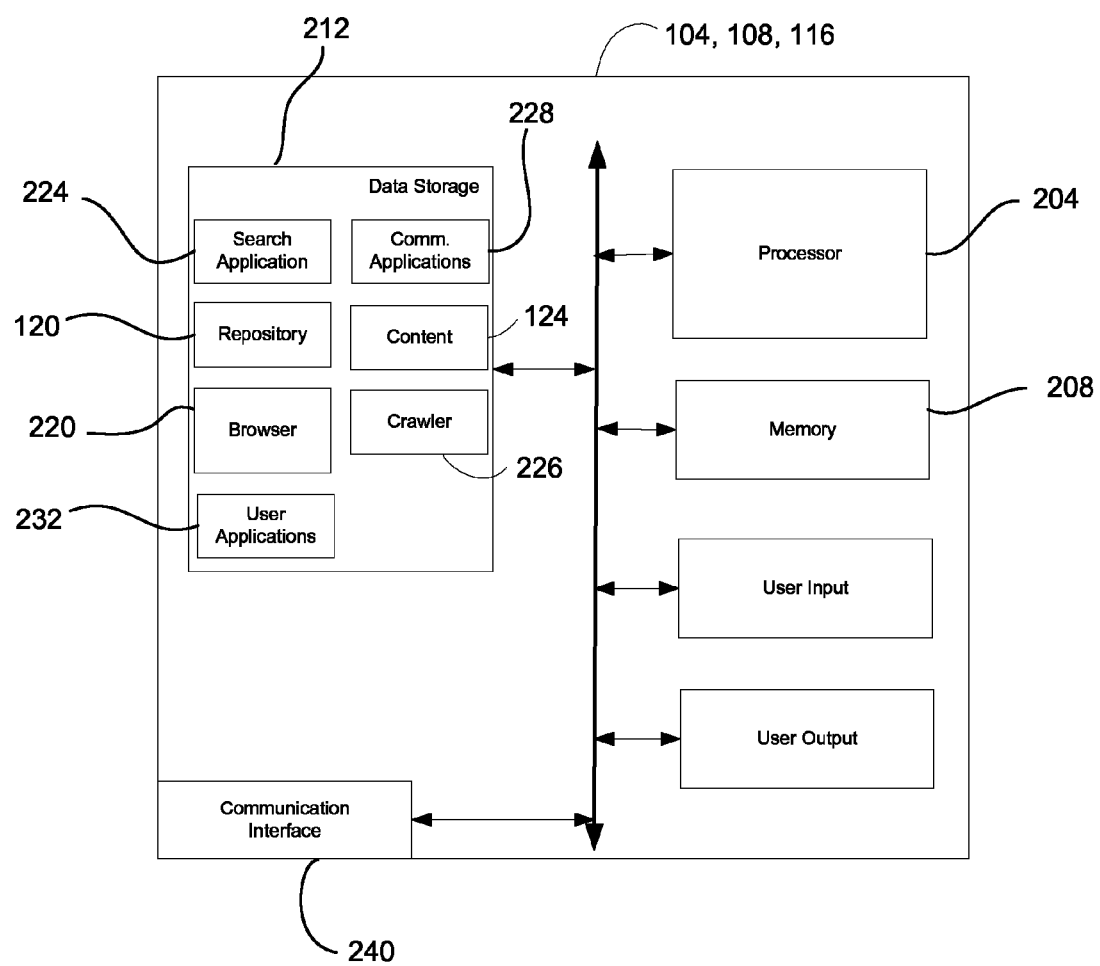
FIG. 2 depicts components of a server and a client device in accordance with embodiments of the present invention.

FIG. 2 is a block diagram depicting components of a system 100 node including a client device 104, a search server 108, and/or an enterprise server 116 in accordance with embodiments of the present invention. In general, the node 104, 108 and 116 includes a processor 204 capable of executing program instructions or software. The processor 204 may include any general purpose programmable processor or controller for executing application programming or instructions. As a further example, the processor 204 may comprise a specially configured application specific integrated circuit (ASIC). The processor 204 generally functions to run programming code or instructions implementing various functions performed by the node 104, 108 or 116 in which it is included.

A node 104, 108 or 116 may additionally include memory 208 for use in connection with the execution of programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present disclosure, data storage 212 can contain program code or instructions implementing various of the applications or functions executed or performed by the node 104, 108 or 116, and data that is used and/or generated in connection with the execution of applications and/or the performance of system 100 functions. Like the memory 208, the data storage 212 may comprise a solid state memory device. Alternatively or in addition, the data storage 212 may comprise a hard disk drive or other random access memory.

In the case of a user or client device 104, examples of application programming or instructions that can be stored in data storage 212 include a web browser application 220. A client device 104 can also include a search application 224. As an example, a search application 224 can comprise a user interface for a search engine, a search engine, or search optimization and/or control software. Moreover, a search application 224 can comprise a stand alone application, or an application that can function through or in conjunction with a browser application 220, for example as a plug in to a browser application 220. Further examples of applications that can be stored in data storage 212 associated with a client device 104 includes various communication applications 228, word processing or other applications for creating or manipulating content 232, and user data or other content 124. As examples, content 124 can include search results, retrieved content, generated content, or any other stored information or data. A client device 104 also generally includes a desktop or device crawler 226. As can be appreciated by one of skill in the art, a desktop crawler 226 operates to populate search repositories. More particularly, a desktop crawler 226 can provide content and index information that can be used in support of search operations to the central repository 120. Moreover, the information to support search operations can include content server and index server information. In accordance with embodiments of the present invention, a desktop crawler 226 can be included in each client device 104 or other node having content 124 that can be searched. In addition, the desktop crawler 226 can implement rules concerning the content that is searchable on the associated client device 104 or other node. Accordingly, the desktop crawler 226 will not include content 124 marked as private or that is otherwise off limits in the search repository data or information it collects. In searching across content 124, the desktop crawler 226 can manage and provide passwords or other credential information that is searchable by at least some nodes of the system 100. Moreover, in accordance with embodiments of the present invention, the repository information generated by a desktop crawler 226 is sent to the central repository 120 on the search server 108 for storage.

A search server 108 can maintain application programming or instructions in associated data storage 212 that includes, for example, content 124 and/or a search application 224. As can be appreciated by one of skill in the art, search applications 224 can include algorithms for queries and for distributing search functions. Moreover, the search applications 224 can perform search functions, for example across devices accessible via the Internet, or communities of devices on a private intranet or other network, or combinations or subsets thereof. In addition, a search server 108 contains a central repository 120. The central repository 120 can contain search data, intermediate search data, index server data and functions, content server data and functions, tables, and/or databases related to searches performed on or in connection with the system 100, and that are the result of or related to operation of the search applications 224. The central repository 120 can also include rules engines and tables for controlling access to search results and to content 124 generally, either on the search server 108 or other system 100 nodes 104, 108 and/or 116. In addition, the central repository 120 can include a copy of the content 124 (i.e., a content store) that has been indexed by the desktop crawler 226 of individual client devices 104 or other nodes.

Examples of application programming or instructions that can be stored in data storage 212 associated with an enterprise server 116 include content 124. Moreover, this content can be maintained as part of a database maintained by the enterprise. An enterprise server 116 can also include a desktop or device crawler 226 that is operable to supply the repository 120 with index information and content with respect to data stored on the enterprise server 116.

Figure 3:
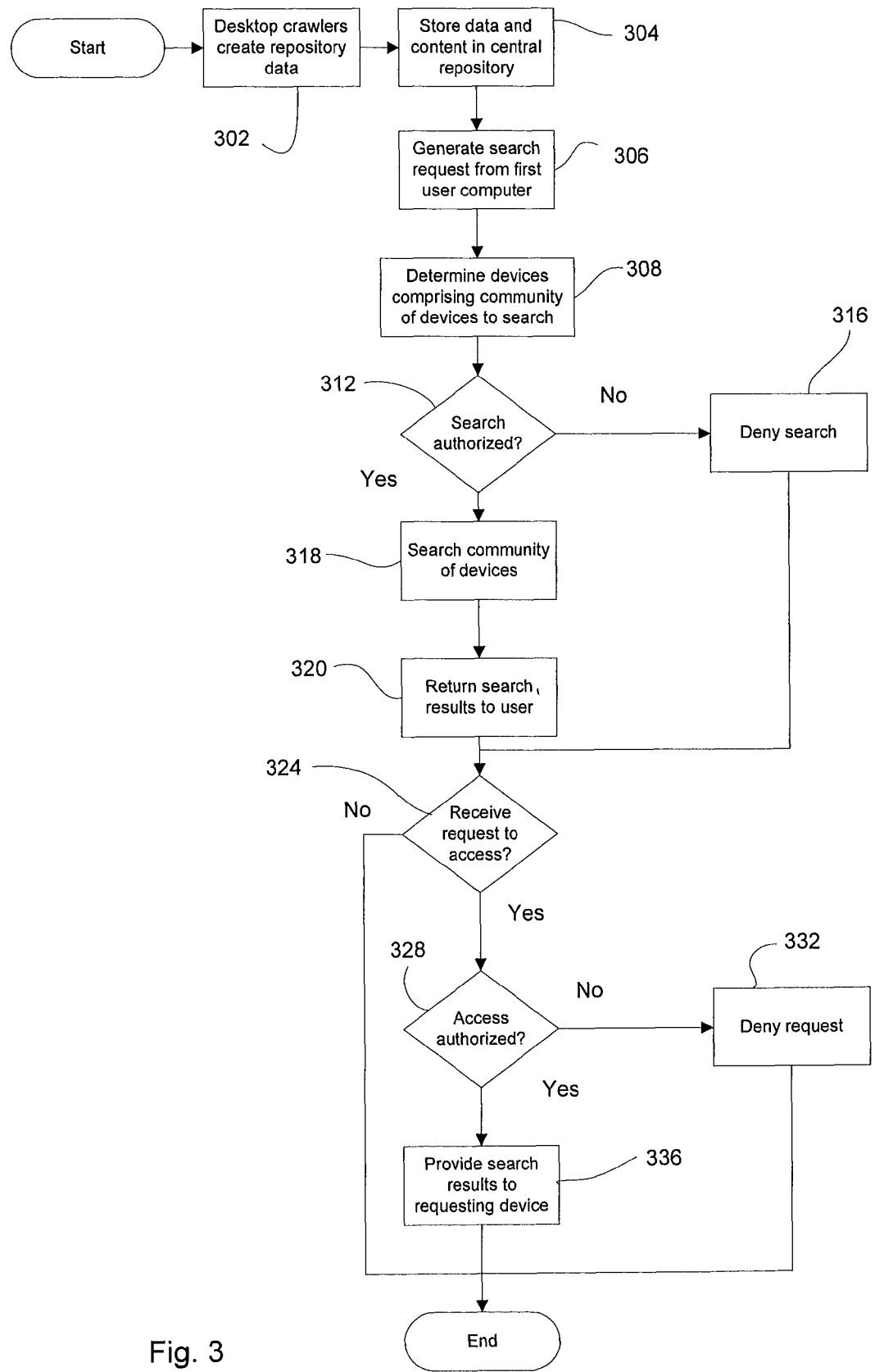
FIG. 3 is a flowchart depicting aspects of a method for conducting searches in accordance with embodiments of the present invention.

With reference now to FIG. 3, aspects of a method for conducting searches in accordance with embodiments of the present invention are illustrated. Initially, at step 302, the desktop crawler or crawlers 226 associated with client devices 104 and/or enterprise servers 116 included in the system 100 are used to create repository data from content 124 contained on the associated device 104 or 116. In accordance with embodiments of the present invention, the content 124 that is the subject of repository data provided to the search server 108 is content 124 that a user or administrator has consented to be subject to inclusion in the central repository 120 data. The repository data and content 124 from the devices 104 and/or 116 is then stored in the central repository (step 304). At step 306, a search request is generated from a first user computer 104. For example, a user of a client device 104 can enter a query in a web browser 220 running on the client device 104. The query is passed to the search application 224. The search application 224 can be stored on and executed by the client device 104, or can be stored on and executed by the search server 108. At step 308, a determination is made as to the community of devices across which the search should be performed. As examples, a search may be confined to the first user computer 104. Accordingly, the search may comprise a local or desktop search. Where a desktop search is performed, the search application 224 is typically stored and executed on the local client device 104. As another example, the search may be of sources publicly available on the Internet. As still another example, the search may be of a private intranet. As yet other example, in accordance with embodiments of the present invention, the search may be conducted across a community of devices. The community of devices may comprise a collection of user devices 104 and/or servers 108, 116, databases, or other sources of data or information, defined according to an organizational structure or overlay. As a further example, embodiments of the present invention permit the adhoc creation of communities. An example of an adhoc community would be a community consisting of the user devices 104 associated with a conference call or other event. Where non-public sources of information are part of the community over which a search is performed, the search may be restricted to certain shared areas of the user device 104 or other source. Accordingly, although searching another user's local information can be enabled by embodiments of the present invention, the visible information on a particular device 104 may comprise some subset of the total information stored on that device 104.

At step 312, a determination may be made as to whether the requested search is authorized. For example, in order to access information contained in a community of devices, the requesting device 104 and/or an associated user must provide authentication information. In accordance with embodiments of the present invention, suitable authentication information may include membership status in the defined community of devices. As another example, authentication may require the presentation of authentication credentials. In accordance with embodiments of the present invention, required authentication information can be provided by a search application 224 and/or by operation of an associated search server 108. Accordingly, embodiments of the present invention can enable searching across private repositories of data, including data to which access is restricted, for example by requiring the presentation of a password and/or other credentials for access. If it is determined that the search is not authorized, the search is denied (step 316). If the search is authorized, the community of devices is searched (step 318). Searching the community of devices can include known search procedures and techniques. For example, the query entered by the user, for example through the browser 220 or into the user interface of a search application 224, is received by the search application 224 and reformulated. The reformulated query is then sent to one or more index servers. As can be appreciated by one of skill in the art, a desktop search can involve index servers that are implemented as a function of a central repository 120 and/or a search application 224 running on the client device 104 on which the search is performed. Moreover, in accordance with embodiments of the present invention, separate index servers can be implemented as functions of a repository and/or a search application 224 running or implemented on the search server 108. In the case of a search conducted over a relatively large network, for example the Internet, index servers can comprise specially configured devices. In general, the index servers or index server function operate to find and order relevant content pointers. These pointers are sent to content servers. Like index servers, content servers can be implemented as part of a central repository 120 and/or a search application 224. Index servers and content servers can also be specially configured devices. The content servers then operate to retrieve data stored as content 124. In accordance with embodiments of the present invention, retrieved content can be obtained from content 124 stored on one or more client devices 104, the search server 108, or an enterprise server 116. In accordance with further embodiments of the present invention, the central repository 120 can also provide a staging area for the temporary storage of data being operated by the index server. In addition, embodiments of the present invention do not require that individual devices 104 or 116 be online and immediately accessible for a search to be performed across content 124 associated with those devices 104, 116. Instead, the latest content 124 and index information, as maintained in the central repository 120, can be used to perform the search.

In accordance with embodiments of the present invention, the results of the search can be in the form of results that are ordered. In accordance with embodiments of the present invention, the ordering of the search results can consider the source of the associated content 124. For example, content 124 sourced from the client device 104 from which the search was initiated, or on a client device 104 of a member of the same organization may be ranked more highly than content 124 from a client device 104 in another organization or content 124 from an enterprise server 116. The search results are then returned to the user (step 320).

At step 324, a determination is made as to whether a request to access content or data supporting search results stored on the central repository 120 has been received. In response to receiving a request, a determination is made as to whether access to the content or data supporting search results is authorized (step 328). If access is not authorized, the request is denied (step 332). If access is authorized, the content and/or data supporting search results are provided to the requesting device (step 336). As with or similar to authorizing a search of non-public devices, access to content or other data can be authorized where required authentication information is provided. For example, access to content or other data stored in a central repository 120 can be authorized where the client device 104 from which the request originates is a member of a community of devices 104 belonging to a common community of devices from which the content or other data was gathered. Alternatively or in addition, authentication may require the presentation of credential information. In accordance with still other embodiments of the present invention, access to search results can be controlled such that all of the search results may be available to some users, but only a subset of the search results may be available to other users. For example, a supervisor or administrator might be able to access an entire set of search results generated in response to a query, while a lower level employee may only be able to access a subset of those search results. After providing results to an authorized device, or after denying the request, the process may end.

For purposes of determining whether content 124 should be made available as part of search results generated in connection with the operation of embodiments of the present invention, various techniques can be applied. For example, a user of a client device 104 on which content 124 is maintained can be asked when indexing is performed by the desktop crawler 226 whether particular content should be available as part of queries. In accordance with further embodiments, searches can be performed across directories or other subdivisions of data across which searches are authorized, and prohibited across other directories or divisions of data across which searching is prohibited. In accordance with still other embodiments, content 124 that is available in response to queries can be determined through the implementation of policies or rules. For example, content 124 marked as private can be excluded from searches.

Controls on the identities of users to whom data related to search results and content 124 are visible can be implemented as an alternative or in addition to controls on content 124 subject to searching. For example, an index entry can be provided that indicates whether particular users or classes of users can see or otherwise access particular items of content 124. For example, an algorithm that determines whether particular content 124 can be provided to a particular user can operate to check for a field or table entry necessary for such disclosure as part of ordering or otherwise gathering search results for presentation to a user. As another example, a set of search results can be generated, and then filtered to remove content 124 that should not be disclosed from those results, before they are presented to a user.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for storing search results, comprising:
   initiating a first search using a first device;
   performing the first search, wherein first search information is generated, wherein the first search is performed across a first plurality of devices associated with a user community who are participating in a conference call or meeting, and wherein the first search is limited to information relevant to the user community who are participating in the conference call or meeting;
   presenting the first search information to a user of the first device;
   using a desktop crawler executed by the first device, performing a second search to identify second search information on the first device, wherein the second search information includes at least some of the first search information;
   providing the second search information from the first device to a central repository on a second device, wherein at least some of the second search information has not previously been received by the second device;
   storing the second search information in the central repository on the second device;
   initiating a third search using one of the first device and a third device; and
   in response to initiating the third search, accessing the second search information stored on the second device from the at least one of the first device and the third device.

2. The method of claim 1, further comprising:
   obtaining content and index information from the first plurality of devices; and
   storing the obtained content and index information in the central repository.

3. The method of claim 2, further comprising:
   enabling access to the content and index information stored on the second device by any device included in a second plurality of devices.

4. The method of claim 3, wherein devices included in the first plurality of devices are the same as devices included in the second plurality of devices.

5. The method of claim 3, wherein the user community is defined by an organizational structure.

6. The method of claim 3, wherein the user community is defined by an event.

7. A search system, comprising:
   a first user computer device, including:
      a processor;
      memory;
      a communication interface; and
      computer code running on the processor of the first user computer device, wherein the computer code is configured to receive and store content and index information received from at least a second user computer device through the communication interface as a result of a search performed by the second user computer device separate from the first user computer device, wherein in response to a search request received from one of the second and a third user computer device, at least a portion of at least one of the stored content and index information is sent to the one of the second and third user computer devices, wherein the search performed by the second user computer device is performed across a first plurality of devices associated with a user community who are participating in a conference call or meeting, and wherein the search performed by the second user computer device is limited to information relevant to the user community who are participating in the conference call or meeting.

8. The system of claim 7, wherein the second user computer device comprises a database.

9. The system of claim 7, wherein the first computer device is a search server, wherein the second user computer device is an enterprise server, and wherein the search request is provided to the search server by a personal computer.

10. The system of claim 7, wherein the computer code includes authentication code, and wherein the search results are provided by the first computer device to another device that provides proper authentication information.

11. A computer implemented search method, comprising:
    performing a first search initiated from a first device across a plurality of devices associated with a user community who are participating in a conference call or meeting, wherein the first search is limited to information relevant to the user community who are participating in the conference call or meeting;
    presenting first search results to a user of the first device;
    performing a second search to provide at least some content and index information from the first device to a second device, wherein at least a portion of the content and index information has not previously been received by the second device;
    storing the content and index information from the plurality of devices on the second device;
    receiving at the second device a request to access at least one of the content and index information;
    authenticating the request to access the at least one of the content and index information; and
    in response to successfully authenticating the request to access the at least one of the content and index information, permitting access to the at least one of the content and index information.

12. The method of claim 11, wherein the first search is performed across the first device.

13. The method of claim 11, wherein the request to access at least one of the content and index information is initiated by a third device, the method further comprising:
    providing the at least one of the content and index information to the third device.

14. The method of claim 11, wherein the plurality of devices comprise a community of devices.

15. The method of claim 14, further comprising:
    providing authentication credentials to at least one device included in the plurality of devices in order to search data stored on the at least one device.

16. The method of claim 1, wherein the first search is limited to information associated with the creation of the conference call or meeting.

17. The method of claim 5, wherein the first search information is ranked based on the organizational structure of the user community.

* * * * *